US011989188B2

(12) United States Patent
Scott, II et al.

(10) Patent No.: US 11,989,188 B2
(45) Date of Patent: May 21, 2024

(54) AGGREGATING ACCESS TO THIRD PARTY DATA SOURCES AND INTELLIGENTLY MANAGING ACCESS THROUGH REQUEST QUOTAS

(71) Applicant: BANK OF AMERICA CORPORATION, Charlotte, NC (US)

(72) Inventors: Phillip Paul Scott, II, Charlotte, NC (US); Jonathan Currie, Charlotte, NC (US); Robert Nicholas D'Aveta, Charlotte, NC (US); Tracey King, Charlotte, NC (US); Daniel Serrano Munoz, Charlotte, NC (US); Alan Shields, Charlotte, NC (US); Joshua Albert Styrcula, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 16 days.

(21) Appl. No.: 17/411,653

(22) Filed: Aug. 25, 2021

(65) Prior Publication Data
US 2023/0069077 A1 Mar. 2, 2023

(51) Int. Cl.
*G06F 16/24* (2019.01)
*G06F 16/2457* (2019.01)
*G06F 21/62* (2013.01)

(52) U.S. Cl.
CPC .... *G06F 16/24575* (2019.01); *G06F 21/6218* (2013.01)

(58) Field of Classification Search
CPC . G06F 16/24575; G06F 21/6218; G06F 16/25
See application file for complete search history.

(56) References Cited

U.S. PATENT DOCUMENTS

| | | | |
|---|---|---|---|
| 924,097 A | 6/1909 | Mcmullen | |
| 8,032,940 B1 | 10/2011 | Dhanani | |
| 8,745,194 B2 | 6/2014 | Uribe-Etxebarria | |
| 8,745,224 B2 | 6/2014 | Smith | |
| 8,755,837 B2 | 6/2014 | Rhoads et al. | |
| 8,844,028 B1 | 9/2014 | Cheng | |
| 8,893,278 B1 | 11/2014 | Chechik | |
| 9,268,849 B2 | 2/2016 | Siedlecki et al. | |
| 9,311,326 B2 | 4/2016 | Goyen | |
| 9,355,247 B1 | 5/2016 | Thioux et al. | |
| 9,465,941 B2 | 10/2016 | Wang et al. | |

(Continued)

*Primary Examiner* — Apu M Mofiz
*Assistant Examiner* — Cindy Nguyen
(74) *Attorney, Agent, or Firm* — Moore & Van Allen PLLC; James C. Edwards

(57) ABSTRACT

Aggregating user access privileges across various third-party data sources and intelligently managing query request quotas delegated by the data sources to users having access privileges. Query requests are received from users and in response determining that the user (i) has been granted access privileges to an identified data source responsive to the query and (ii) has available query requests from their specific allocated amount of query request quota, the query request is authorized for submission to the data source that is responsive to the query. Intelligent management of query request quotas includes determining query request quota allotments for each user including adjusting query request quotas when users have been identified as requiring an increase or decreasing in quota allotment.

10 Claims, 7 Drawing Sheets

(56) References Cited

U.S. PATENT DOCUMENTS

| | | | |
|---|---|---|---|
| 9,628,549 B1 | 4/2017 | Kee et al. | |
| 9,654,576 B2 | 5/2017 | Jolfaei | |
| 10,078,668 B1 | 9/2018 | Woodrow et al. | |
| 10,178,046 B1* | 1/2019 | Murugesan | H04L 41/00 |
| 10,331,505 B2 | 6/2019 | Aguilar Mares et al. | |
| 10,334,083 B2 | 6/2019 | Katmor et al. | |
| 2011/0320592 A1* | 12/2011 | Kemmerer, Jr. | H04L 67/5682 |
| | | | 709/224 |
| 2015/0347773 A1 | 12/2015 | Bonney et al. | |
| 2016/0306897 A1 | 10/2016 | Huang et al. | |
| 2017/0091778 A1* | 3/2017 | Johnson | G06Q 10/06311 |
| 2018/0314731 A1* | 11/2018 | Mathew | G06F 16/256 |
| 2021/0044549 A1* | 2/2021 | Renjith | H04L 67/566 |
| 2021/0117251 A1* | 4/2021 | Cristofi | G06F 9/542 |

\* cited by examiner

AGGREGATING ACCESS TO THIRD PARTY DATA SOURCES AND INTELLIGENTLY MANAGING ACCESS THROUGH REQUEST QUOTAS

FIELD OF THE INVENTION

The present invention is generally directed to querying data sources in a computing network and, more specifically, aggregating access to third party data sources and intelligently managing access through request quotas.

BACKGROUND

In global enterprises, numerous external, otherwise referred to herein as third-party or vendor data sources may be implemented. For example, security organizations within a global enterprise may have a need to implement third-party data sources for purposes of providing information about domains, geolocation of IP (Internet Protocol) addresses and the like. However, within a global enterprise or some other lesser organization these data sources are highly disconnected. For example, the various different data sources that a global enterprise or the like relies on for data may be controlled by different entities therein. This typically means that each controlling entity controls the means by which users have access to their respective third-party data sources. Authentication/access to third-party data sources may be controlled by Application Programming Interface (API) keys, such that, when a user outside of the controlling entity requires access to a data source they must request and be provided the API keys in order to gain access. Such a sharing of authentication keys is problematic from a security standpoint, in that, no assurance is provided that the user will not abuse the access credentials (e.g., share them with other users or the like).

Moreover, access to third-party data sources is typically limited, based on subscription or the like, to a specific number of queries, referred to herein as a quota, over a specified time period. Each API/authentication key typically has an allotted quota (i.e., a specific number of query requests that can be made over a specified time period, such as a day or the like). In the event that the API/authentication key is shared with a user outside of the controlling entity, there is the additional concern that the user will consume the entirety of the quota for a given time period.

Therefore, a need exists to develop systems, methods, computer program products and the like that aggregate access privileges to multiple different disconnected third-party data sources and, in conjunction with aggregation of access privileges, intelligently manage query request quotas allotted to each data source amongst users granted access privileges.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by aggregating access privileges across various third-party data sources and intelligently managing query request quotas delegated by the data sources across multiple users having access privileges. In this regard, systems, methods and the like are able to receive query requests from users and determine whether the user has been granted access privileges to a data source responsive to the query and, if so, determine whether the user has available query requests from their specific allocated amount of query request quota. In response to determining that user has available query requests, the query request is authorized for submission to the data source that is responsive to the query.

In specific embodiments of the invention, the systems, methods and the like, the query requests are not configured or otherwise pointed to a specific data source or route within a data source. In this regard, according to specific embodiments, gateway type processing is implemented that identifies the data source responsive to the query and, in some embodiments, a specific route within the data source which provides access to the data responsive to the query.

Moreover, specific embodiments of the invention provide for intelligently determining query request quotas for each authorized user. In this regard, embodiments of the present invention are configured to identify users who would benefit from an increase in their respective query request total (i.e., users that continually using all of their allotted request quota) and, in response to providing those users with an increase in query request quota, automatically readjust other user's query request quotas to account for users with the increased query request quotas.

As such the present invention, provides for a secure and centralized means for controlling user access across various disconnected data sources. Moreover, the present invention provides an intelligent approach to managing query request quotas across multiple users having access privileges. In this regard, the invention not only insures that the collective users adhere to the overall entities query request quota, but also, provides for intelligent determination and adjustment of individual user query request quotas based on actual and, in some instances, predicted use of query requests.

A system for aggregating access to third-party data sources and intelligently managing access through request quotas defines first embodiments of the invention. The system includes a plurality of third-party data sources. The third-party data sources are configured to receive queries from a plurality users and, in response to receiving a query, return data that is responsive to the query. The system additionally includes a first computing platform having a first memory and one or more first processing devices in communication with the memory. The first memory stores query request proxy instructions that are executable by the one or more processors. The query request proxy instructions are configured to receive a query request from one of the plurality of users. The query request requests data that is responsive to a query. In response to receiving the query request, the query request proxy instructions are further configured to determine that the user has access privileges for accessing the third-party data sources that is configured to act on the query and provide the data. In response to determining that the user has access privileges, the query request proxy instructions are configured to determine that the user has available queries from a first query quota that is specific to the one of the data sources. The first query quota defines a volume of queries that the user is allowed to submit to the one of the data sources over a predetermined period of time. In response to determining that the user has available queries from the predetermined query quota, the query request proxy instructions are further configured to authorize the query for submission to the corresponding third-party data source.

In specific embodiments the system further includes a second computing platform having a second memory and one or more second processing devices in communication with the memory. The second memory stores gateway instructions, executable by the one or more processors and configured to receive the query request from one of the plurality of users, and, in response identify the one of the plurality of third-party data sources that is configured to act on the query and provide the data, and, identify a route within the one of the third-party data sources that is configured to act on the query and provide the data. In this regard, the query request itself does not identify or point to the data source and/or the route within the data source.

In other specific embodiments of the system, the first instructions are further configured to determine that the user has access privileges for accessing a route within the one of the plurality third-party data sources that is configured to act on the query and provide the data. In this regard, access privileges are not only granted at the data source level but may also be granted at the route level. In further related embodiments of the system, the first instructions are further configured to determine that the user has available queries from a second query quota that is specific to a route within the one of the third-party data sources that is configured to act on the query and provide the data. The second query quota defines a volume of queries that the user is allowed to submit to the route over a predetermined period of time. In this regard a user may have a query quota specific to the data sources and a separate query quotas specific to one or more routes within the data source.

In other further embodiments of the system, the first instructions are further configured to, prior to authorizing the query, determine that the route the data source is valid by comparing a route defined by (e.g., derived from or assigned to) the query request to known routes of the one of the plurality of data sources.

In still further specific embodiments of the system, the first instructions are further configured to determine whether the data responsive to the query is stored in cache memory, and, in response to determining that the data responsive to the query is stored in cache memory, retrieving the data from the cache memory and communicating the data to the user, or response to determining that the data responsive to the query is not stored in cache memory, submit the query to the one of the plurality of data sources. In related embodiments of the system, the first instructions are further configured to determine whether the query request is configured to bypass the determination of whether the data responsive to the query is stored in the cache, and in response to determining that the query request is configured to bypass the determination of whether the data responsive to the query is stored in the cache, submit the query to the data source, or in response to determining that the query request is not configured to bypass the determination of whether the data responsive to the query is stored in the cache, determine whether the data responsive to the query is stored in cache memory.

In additional specific embodiments the system includes a second computing platform having a second memory and one or more second processing devices in communication with the memory. The second memory stores query quota determining instructions that are executable by the one or more second processing devices. The query quota determining instructions are configured to determine, for users having access privileges to a data source, the first query quota based at least on a volume of the users with access privileges and a volume of queries allowed to be submitted to the one of the plurality of data sources over the predetermined period of time. In related embodiments of the system, the query quota determining instructions are further configured to determine, for users having access privileges to a route within the one of the plurality of data sources, a second query quota based at least on the volume of the one or more users and a volume of queries allowed to be submitted to the route within the one of the plurality of data sources over the predetermined period of time. In further related embodiments of the system, the query quota determining instructions are further configured to identify at least one of the users that justify an increase in their respective first query quota, and, in response to increasing the first query quota for the at least one of the one or more of the plurality of users, adjust the first query quota for other ones of the one or more of the plurality of users.

Moreover, in additional embodiments the system includes a second computing platform having a second memory and one or more second processing devices in communication with the memory. The second memory stores analytics instructions, executable by the one or more second processing devices and configured to store information associated with each query request received by the query request proxy instructions. The information includes, for each query request, a user submitting the query request and a date when the query request was received. The analytics instructions are further configured to receive a second user input that customizes metrics responsive to the stored information and present a dashboard to the second user that displays the customized metrics.

A computer-implemented method for aggregating access to third-party data sources and intelligently managing access through request quotas defines second embodiments of the invention. The computer-implemented method is executed by one or more processing device. The method includes receiving a query request from a user. The query request requests data that is responsive to a query, In addition, the method includes determining that the user has access privileges for accessing one of a plurality third-party data sources that is configured to act on the query and provide the data. Further, the method includes, in response to determining that the user has access privileges, determining that the user has available queries from a first query quota that is specific to the one of the plurality of data sources. The first query quota defines a volume of queries that the user is allowed to submit to the one of the data sources over a predetermined period of time. In addition, the method includes, in response to determining that the user has available queries from the predetermined query quota, authorizing the query for submission to the one of the third-party data sources.

In specific embodiments the method further includes identifying the one of the plurality of third-party data sources that is configured to act on the query and provide the data, and identifying a route within the one of the third-party data sources that is configured to act on the query and provide the data.

In other specific embodiments the method further includes determining that the user has access privileges for accessing a route within the one of the plurality third-party data sources that is configured to act on the query and provide the data, and determining that the user has available queries from a second query quota that is specific to the route within the one of the third-party data sources that is configured to act on the query and provide the data, wherein the second query quota defines a volume of queries that the user is allowed to submit to the route over a predetermined period of time.

In additional specific embodiments the method further includes prior to authorizing submission of the query, determining that a route to the one of the plurality of data sources is valid by comparing a route defined by the query request to known routes of the one of the plurality of data sources.

In still further specific embodiments the method includes determining whether the query request is configured to bypass a determination of whether the data responsive to the query is stored in the cache, in response to determining that the query request is configured to bypass the determination of whether the data responsive to the query is stored in the cache, submitting the query to the one of the plurality of data sources, and in response to determining that the query request is not configured to bypass the determination of whether the data responsive to the query is stored in the cache, determining whether the data responsive to the query is stored in cache memory.

A computer program product including a non-transitory computer-readable medium defines third embodiments of the invention. The non-transitory computer-readable medium includes a first set of codes for causing a computer to receive a query request from a user. The query request requests data that is responsive to a query. In addition, the computer-readable medium includes a second set of codes for causing a computer to determine that the user has access privileges for accessing one of a plurality third-party data sources that is configured to act on the query and provide the data. Additionally, the computer-readable medium includes a third set of codes for causing a computer to, in response to determining that the user has access privileges, determine that the user has available queries from a first query quota that is specific to the one of the plurality of data sources. The first query quota defines a volume of queries that the user is allowed to submit to the one of the data sources over a predetermined period of time. Further, the computer-readable medium includes a fourth set of codes for causing a computer to, in response to determining that the user has available queries from the predetermined query quota, authorize the query for submission to the one of the third-party data sources.

In specific embodiments of the computer program product, the computer-readable medium further includes a fifth set of codes for causing a computer to identify the one of the plurality of third-party data sources that is configured to act on the query and provide the data, and identify a route within the one of the third-party data sources that is configured to act on the query and provide the data.

In other specific embodiments of the computer program product, the computer-readable medium further includes a fifth set of codes for causing a computer to determine that the user has access privileges for accessing a route within the one of the plurality third-party data sources that is configured to act on the query and provide the data, and a sixth set of codes for causing a computer to determine that the user has available queries from a second query quota that is specific to the route within the one of the third-party data sources that is configured to act on the query and provide the data. The second query quota defines a volume of queries that the user is allowed to submit to the route over a predetermined period of time.

Moreover, in additional specific embodiments of the computer program product, the computer-readable medium includes a fifth set of codes for causing a computer to determine whether the query request is configured to bypass a determination of whether the data responsive to the query is stored in the cache, in response to determining that the query request is configured to bypass the determination of whether the data responsive to the query is stored in the cache, submitting the query to the one of the plurality of data sources, and, in response to determining that the query request is not configured to bypass the determination of whether the data responsive to the query is stored in the cache, determining whether the data responsive to the query is stored in cache memory.

Thus, according to embodiments of the invention, which will be discussed in greater detail below, the present invention addresses needs and/or achieves other advantages by aggregating access privileges across various third-party data sources and intelligently managing query request quotas delegated by the data sources across multiple users having access privileges. The intelligent management of query request quota includes determining individual user quotas and identify users that require query requests beyond their allocated quotas, and, in response adjusting the identified users' quotas, as well as, adjusting the remaining users' quotas, accordingly.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
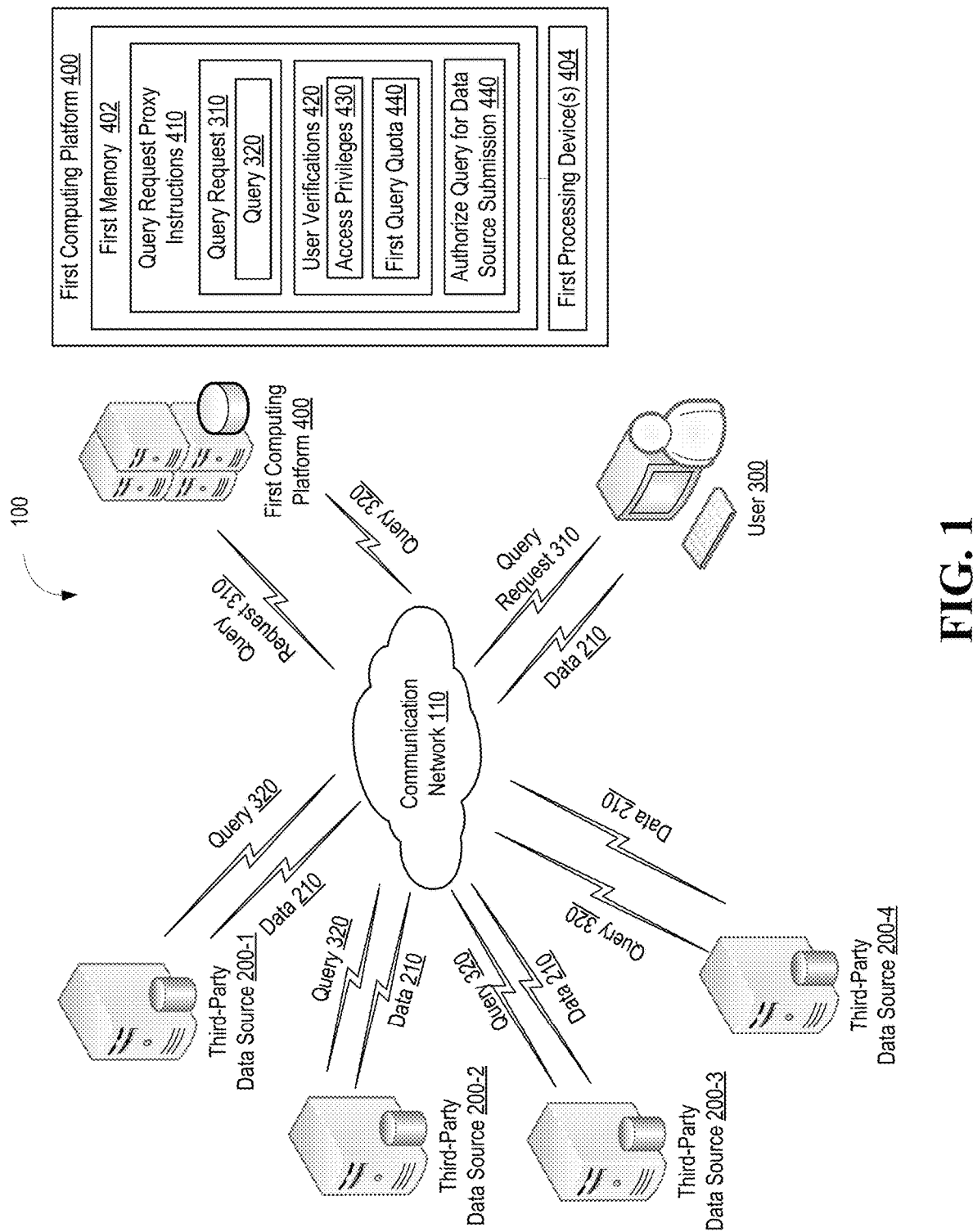
Figure 2:
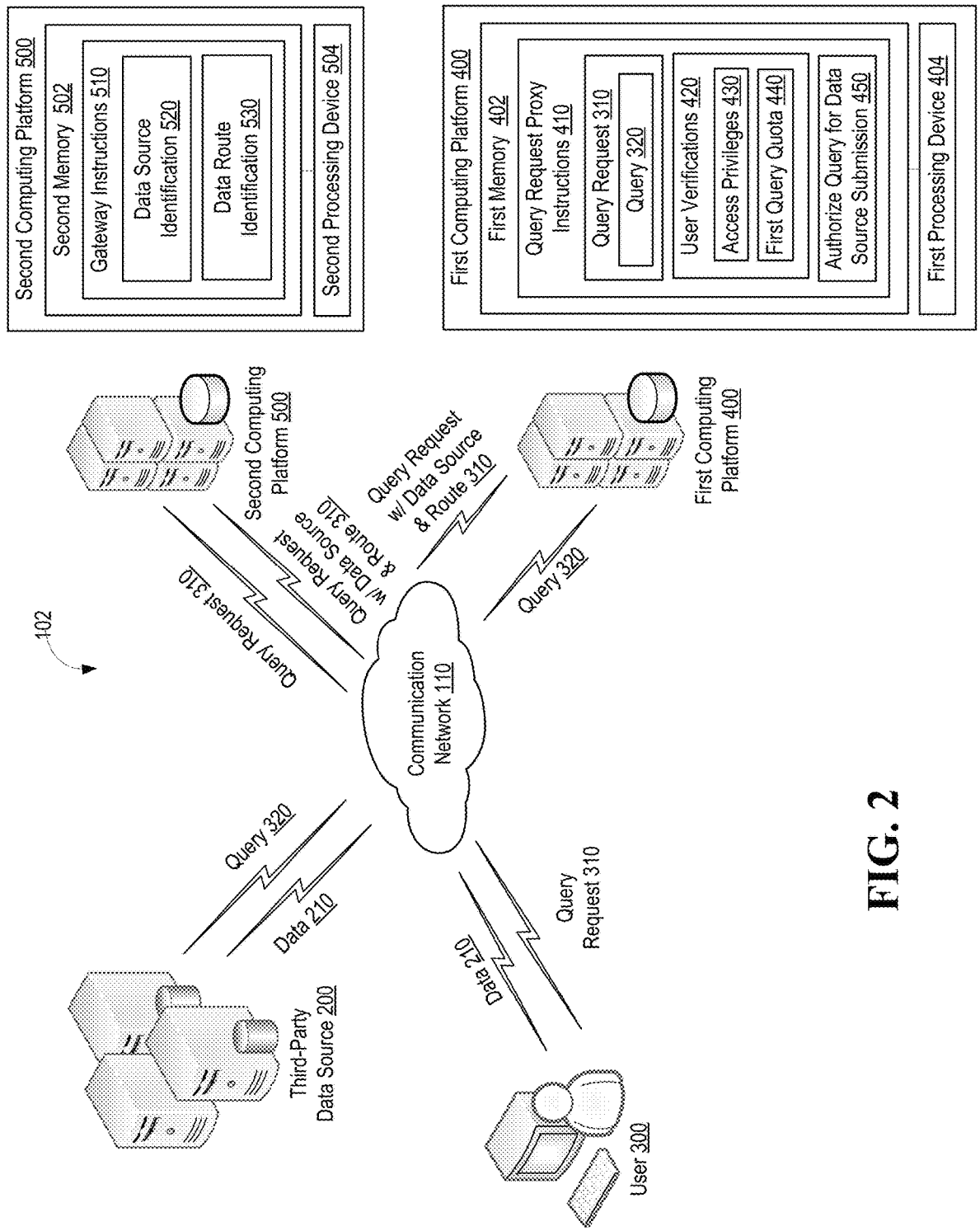
Figure 3:
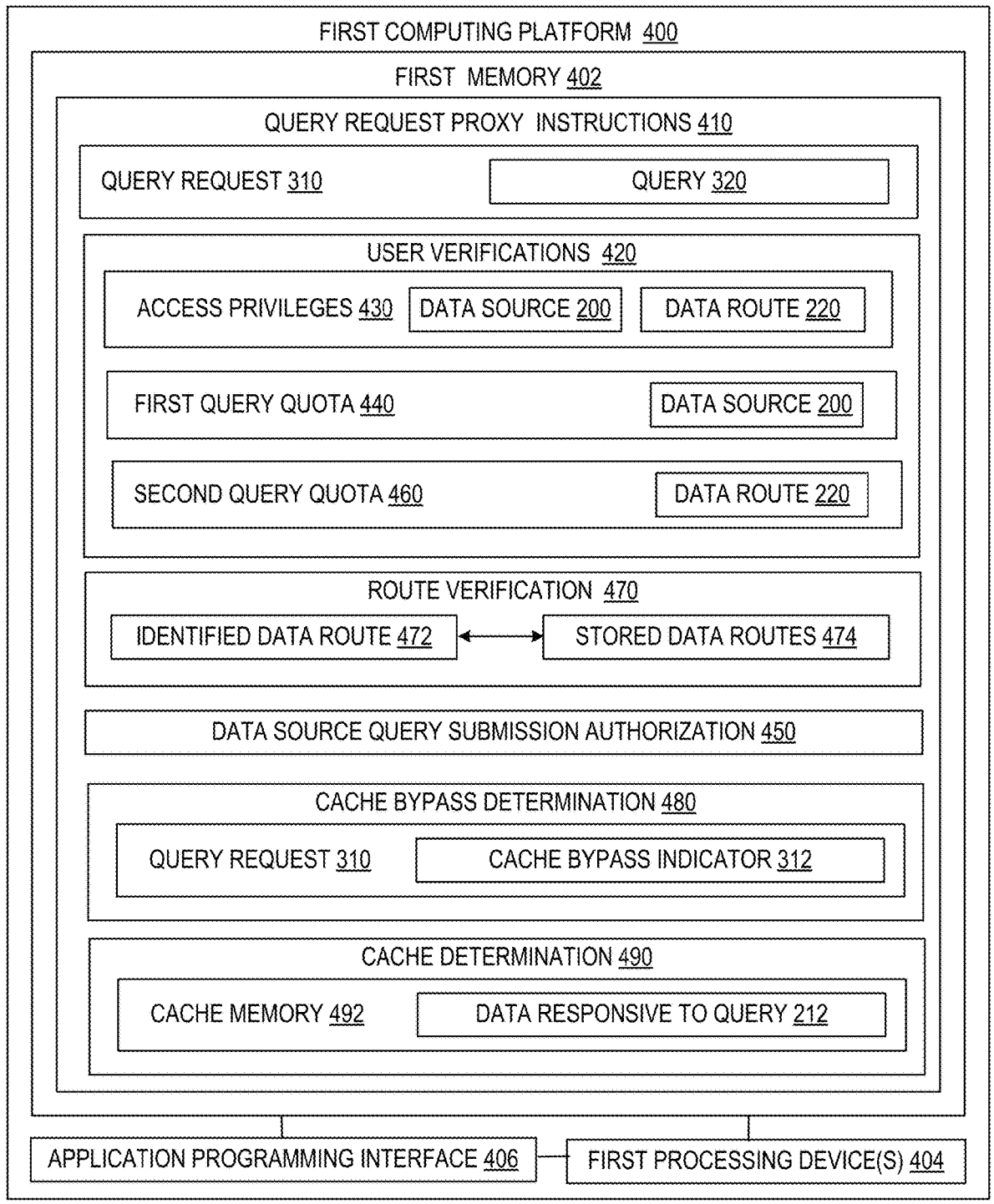
Figure 4:
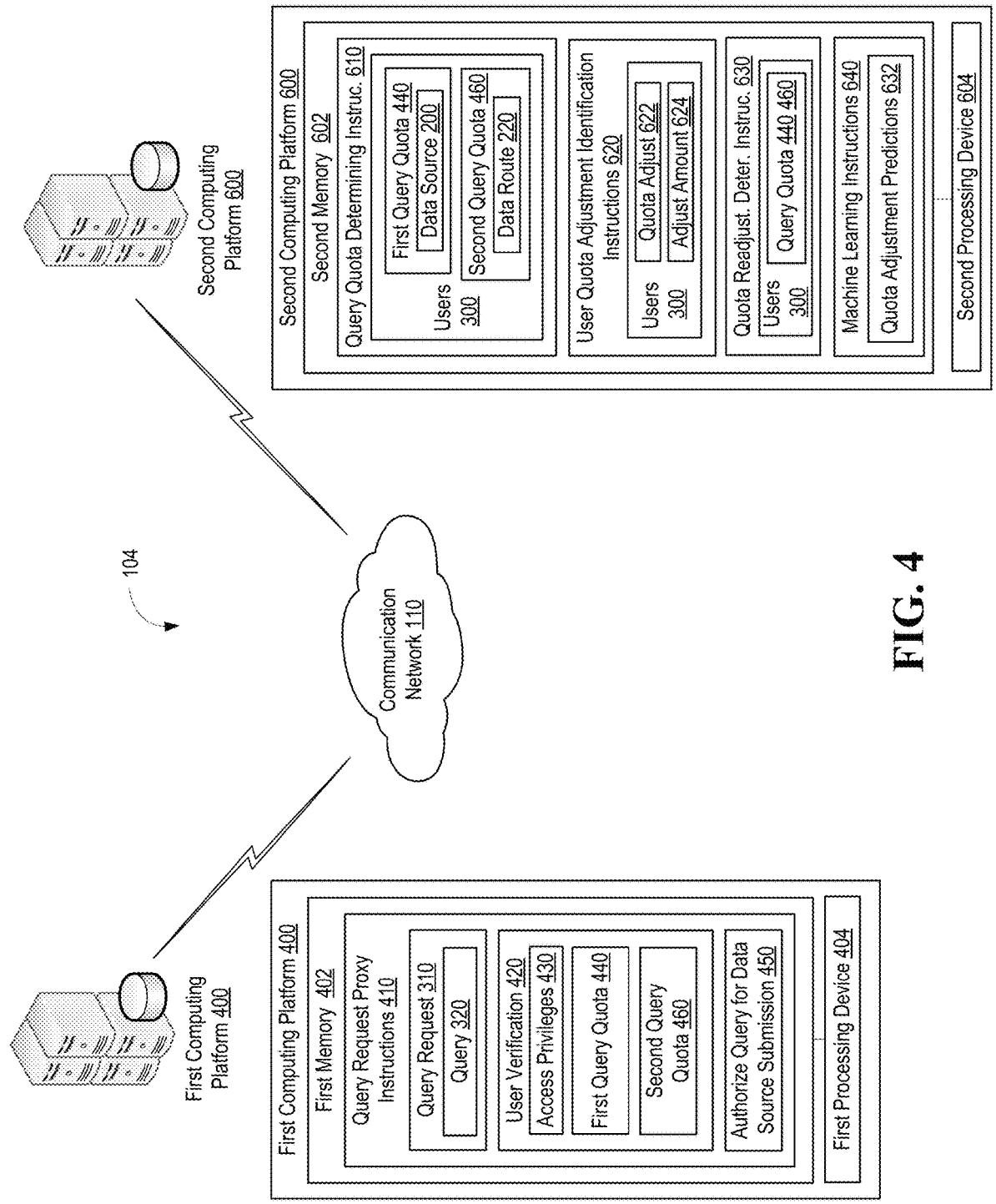
Figure 5:
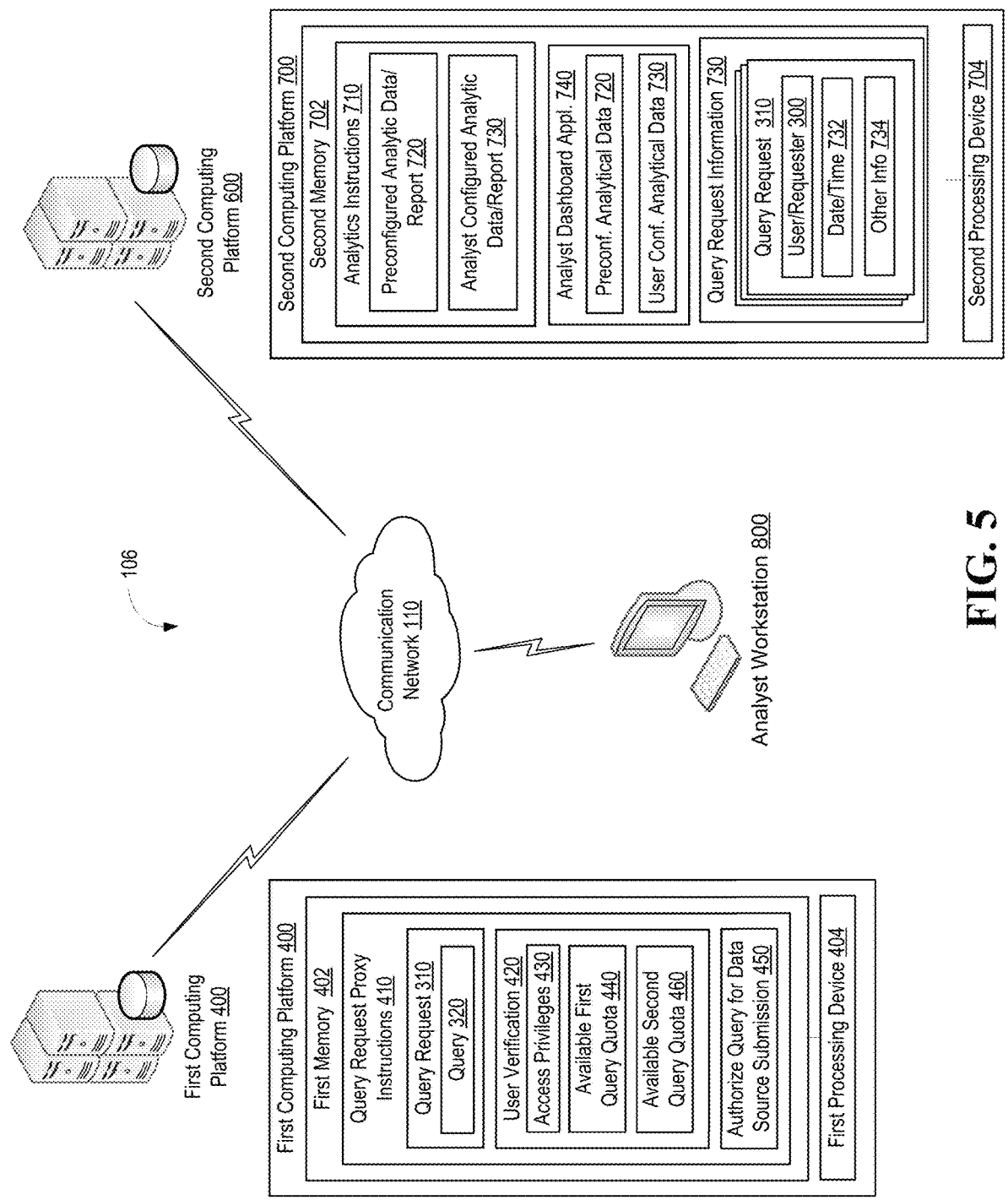
Figure 6:
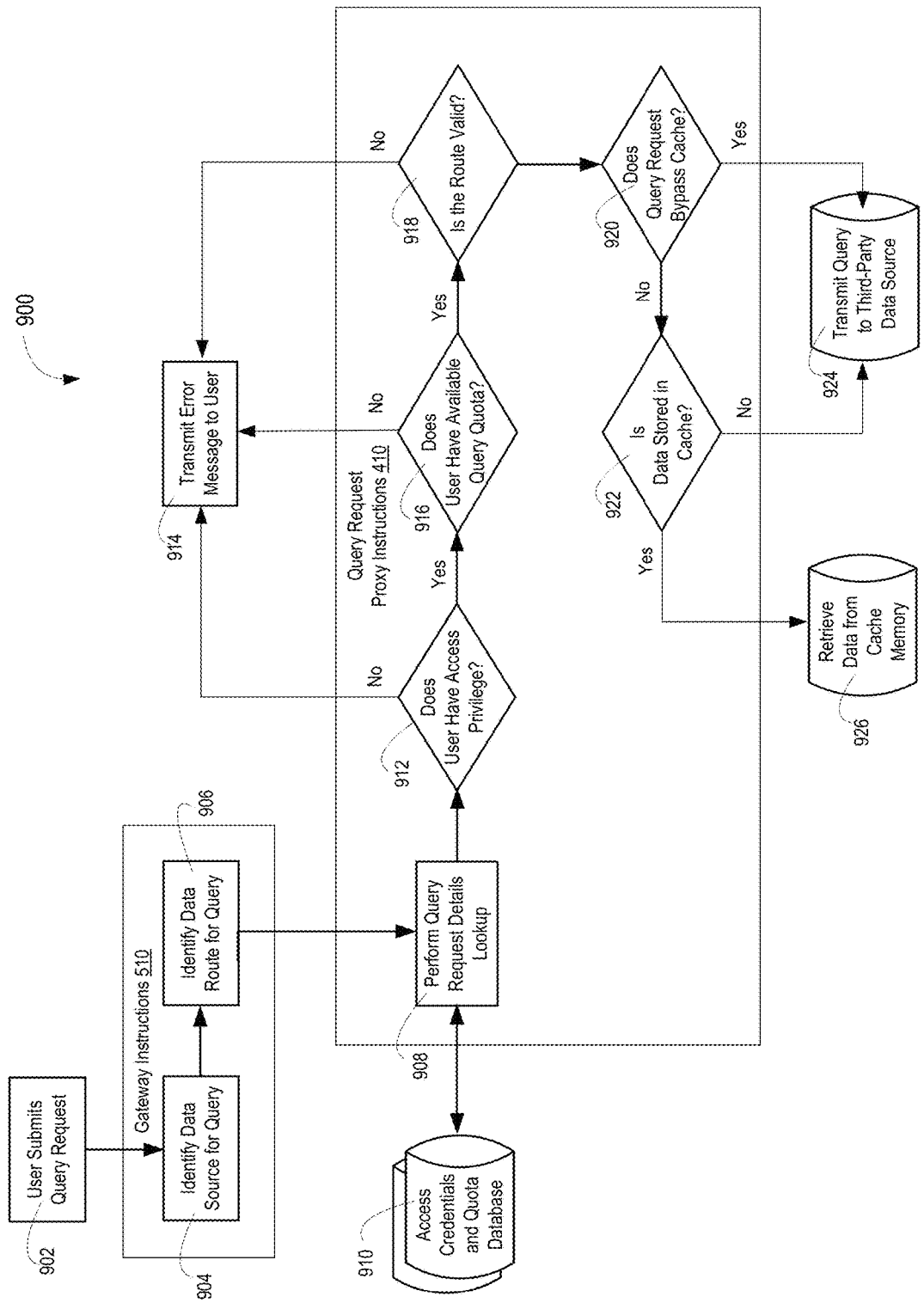
Figure 7:
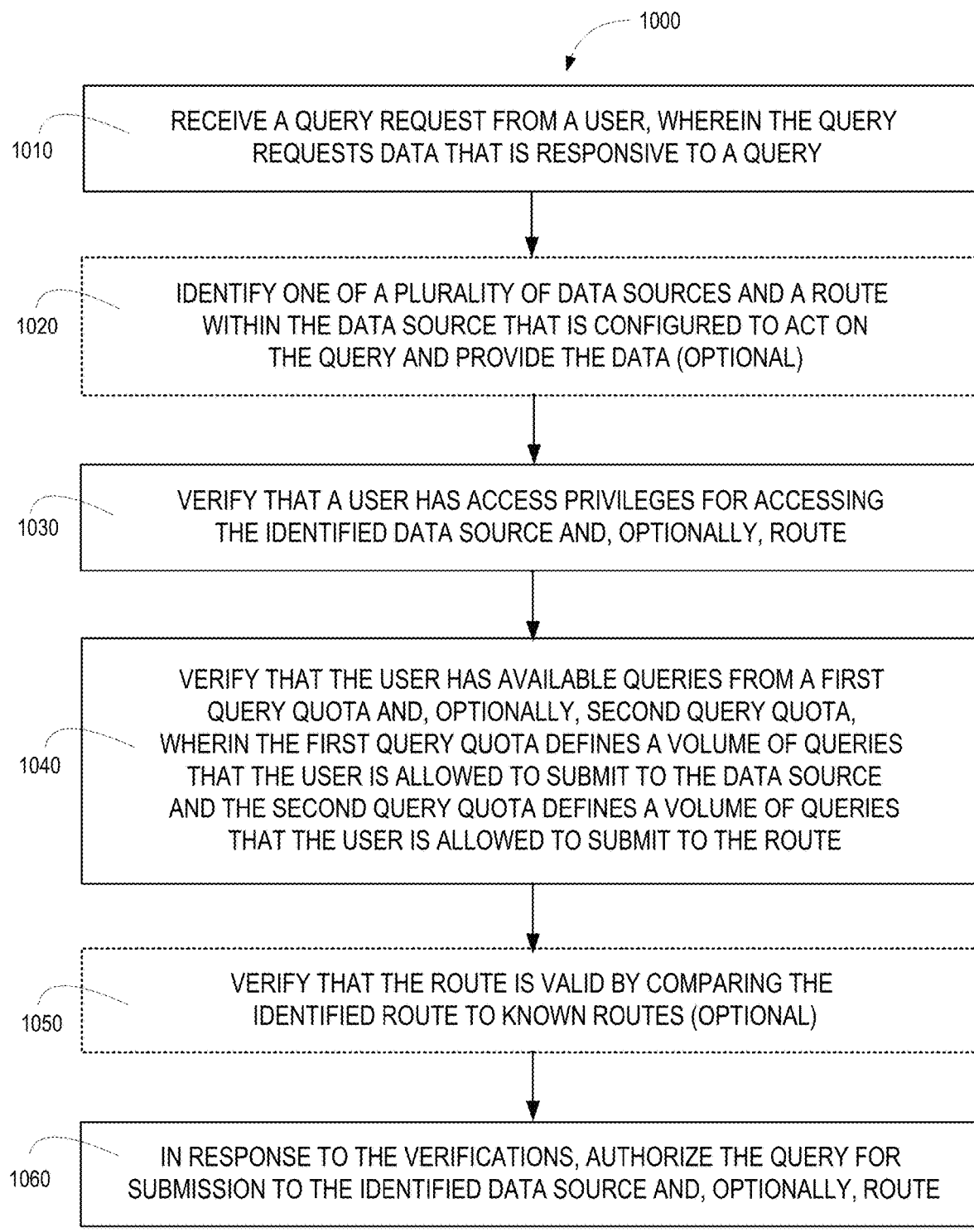

Having thus described embodiments of the disclosure in general terms, reference will now be made to the accompanying drawings, wherein:

FIG. 1 is a schematic/block of a system for aggregating access privileges across various third-party data sources and intelligently managing query request quotas delegated by the data sources across multiple access privileged users, in accordance with embodiments of the present invention;

FIG. 2 is a schematic/block diagram of an alternate system for aggregating access privileges including query request identification of data sources and routes within the data sources, in accordance with embodiments of the present invention;

FIG. 3 is a block diagram of a computing platform configured for aggregating access privileges across various third-party data sources and intelligently managing query request quotas delegated by the data sources across multiple access privileged users, in accordance with alternate embodiments of the present invention;

FIG. 4 is schematic/block diagram of an alternate system for intelligently managing query request quotas delegated by the data sources across multiple access privileged users including determination and adjustment of data source-specific query quotas and route-specific query quotas, in accordance with embodiments of the present invention;

FIG. 5 is schematic/block diagram of an alternate system for providing analytical data within a system that aggregates access privileges across various third-party data sources and intelligently manages query request quotas delegated by the data sources across multiple access privileged users, in accordance with alternate embodiments of the present invention;

FIG. 6 is a flow diagram of a detailed method for query request submission; in accordance with embodiments of the present invention; and FIG. 7 is a flow diagram of a method for aggregating access privileges across various third-party data sources and intelligently managing query request quotas delegated by the data sources across multiple access privileged users, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for aggregating access privileges across various third-party data sources and intelligently managing query request quotas delegated by the data sources across multiple access privileged users. In this regard, systems, methods and the like are able to receive query requests from users and determine whether the user has been granted access privileges to a data source responsive to the query and, if so, determine whether the user has available query requests from their specific allocated amount of query request quota. In response to determining that user has available query requests, the query request is authorized for submission to the data source that is responsive to the query.

In specific embodiments of the invention, the systems, methods and the like, the query requests are not configured or otherwise pointed to a specific data source or route within a data source. In this regard, according to specific embodiments, gateway type processing is implemented that identifies the data source responsive to the query and, in some embodiments, a specific route within the data source which provides access to the data responsive to the query.

Moreover, specific embodiments of the invention provide for intelligently determining query request quotas for each authorized user. In this regard, embodiments of the present invention are configured to identify users who would benefit from an increase in their respective query request total (i.e., users that continually using all of their allotted request quota) and, in response to providing those users with an increase in query request quota, automatically readjust other user's query request quotas to account for users with the increased query request quotas.

As such the present invention, provides for a secure and centralized means for controlling user access across various disconnected data sources. Moreover, the present invention provides an intelligent approach to managing query request quotas across multiple users having access privileges. In this regard, the invention not only insures that the collective users adhere to the overall entities query request quota, but also, provides for intelligent determination and adjustment of individual user query request quotas based on actual and, in some instances, predicted use of query requests.

Referring to FIG. 1, a schematic diagram is presented of an exemplary system 100 for aggregating access privileges across various third-party data sources and intelligently managing query request quotas delegated by the data sources across multiple access privileged users, in accordance with embodiments of the present invention. The system 100 is implemented across a distributed communication network 110, which may include the Intranet, one or more intranets, one or more cellular networks or the like. As depicted, the system 100 a plurality of disparate third-party data source 200-1, 200-2, 200-3 and 200-4, otherwise referred to as vendor or external data sources. The data sources 200 are configured to receive queries from users 300 and, in response, return data that is responsive to the queries. Since the data sources 200 are third-party/vendor data sources, the enterprise (i.e., a plurality of users 300) or the like that employs the third-party/vendor data sources 200 is typically limited, by subscription or the like, to a certain predetermined number, referred to herein as query quotas, over a predetermined time period (e.g., a day, week or the like). While FIG. 1 depicts four third-party data sources 200-1, 200-2, 200-3 and 200-4 one of ordinary skill in the art will appreciate that a system 100 many comprise less and, typically, more data sources 200.

System 100 additionally includes a first computing platform 400 having a memory 402 and one or more processing devices 404 in communication with the memory 402. The memory 402 stores query request proxy instructions 410, which are executable by at least one of the processing device(s) 404. Query request proxy instructions 410 are configured to receive a query request 310 from a user 300 that requests data 210 that is responsive to a query 320. In response to receiving the query request 310, query request proxy instructions 410 are configured to perform user verifications 420. Specifically, verifying that the user 300 has access privileges 430 to the data source 200 at which the query 320 is to be submitted and verifying that the user 300 has availability from a first query quota 440 that is specific to the data source 200 at which the query 320 is to be submitted and defines the volume of queries 320 that the user 300 is permitted to submit to the data source 200 over a predetermined period of time.

In specific embodiments of the invention, access privileges 430 to specific data sources 200 are controlled by Application Programming Interface (API) keys, which in specific embodiments of the invention, are vaulted API keys (i.e., obfuscated to hide the actual key/passcode). A user 300 requests access privileges 440 and is granted approval by an entity within an enterprise or the like that has control over the third-party data source 200. In response the user receives a security feature, such as a group within Active Directory® (AD) (available from Microsoft Corporation, Redmond, WA), which is used to assign permissions/access credentials 440 across shared resources, in this instance third-party data sources 200.

In response to performing the user verifications 420, query request proxy instructions 410 are configured to authorize 450 the query call for submission to the data source 200-1, 200-2, 200-3 or 200-4 that is responsive to the query 320.

Referring to FIG. 2, a block diagram is presented of an alternate system 102 for aggregating access privileges across various third-party data sources and intelligently managing query request quotas delegated by the data sources across multiple access privileged users, in accordance with embodiments of the present invention. As discussed in relation to FIG. 1, system 100 includes a plurality of third-party data sources 200, and first computing platform 400, which was described in relation to FIG. 1.

System 102 additionally includes second computing platform having a second memory 502 and one or more second processing devices 504 in communication with the memory 502. Memory 502 stores gateway instructions 510 that are executable by at least one of the processing devices 504. Gateway instructions 510, which, in specific embodiments of the invention, implements GraphQL programming language, are configured for data source identification 510 and data route identification 530. In this regard, according to embodiments of the present invention, the query requests 310 do not point to a specific data source 200 or route within the data source 220. Instead the query requests 310 are limited to details related to the data 210 that is being requested. Based on details related to the data 210 that is being requested and the structure of the query 320, gateway instructions 510 can identify which one of a plurality data sources 200 is configured to be responsive to the query 320 and, specifically, which route 220 within the data source 200 is best suited for providing the data 210 responsive to the query 320.

Referring to FIG. 3, a block diagram is depicted of first computing platform 400, in accordance with embodiments of the present invention. In addition to providing greater detail, FIG. 3 highlights various alternate embodiments of the invention. First computing platform 400 comprises one or more computing devices/apparatus, such as servers or the like configured to execute software programs, including instructions, engines, algorithms, modules, routines, applications, tools, and the like. First computing platform 400 includes first memory 402, which may comprise volatile and non-volatile memory, EPROM, EEPROM, flash cards, or any memory common to computer platforms. Moreover, first memory 402 may comprise cloud storage, such as provided by a cloud storage service and/or a cloud connection service.

Further, first computing platform 400 also includes first processing device(s) 404, which may be an application-specific integrated circuit ("ASIC"), or other chipset, logic circuit, or other data processing device. First processing device 404 may execute an application programming interface ("API") 406 that interfaces with any resident programs, such as query request proxy instructions 410 and algorithms, sub-engines/routines associated therewith or the like stored in the memory 502 of the computing platform 500.

Processing device(s) 504 may include various processing subsystems (not shown in FIG. 3) embodied in hardware, firmware, software, and combinations thereof, that enable the functionality of computing platform 500 and the operability of computing platform 500 on a distributed communication network 110 (shown in FIGS. 1 and 2). For example, processing subsystems allow for initiating and maintaining communications and exchanging data with other networked devices. For the disclosed aspects, processing subsystems of first processing device 404 may include any subsystem used in conjunction with query request proxy instructions 410 and related engines, routines, algorithms, sub-algorithms, modules, sub-modules thereof.

First computing platform 400 additionally includes a communications module (not shown in FIG. 3) embodied in hardware, firmware, software, and combinations thereof, that enables electronic communications between first computing platform 400 and other networks and/or networked devices, such as, third-party data source data sources 200, user 300 workstations and the like. Thus, the communication module may include the requisite hardware, firmware, software and/or combinations thereof for establishing and maintaining a network communication connection with one or more systems, platforms, networks, or the like.

As previously discussed in relation to FIG. 1, memory 402 stores query request proxy instructions 410 that are executable by the processing device(s) 404 and configured to process query requests 310 for subsequent calls to third-party data sources 300. Specifically, query request proxy instructions 410 are configured to receive a query request 310 from a user 300 that requests data 210 that is responsive to a query 320. As previously discussed in relation to alternate embodiments related to FIG. 2, prior to the query request 310 being received by the proxy instructions 410, the query request 310 undergoes process by gateway instructions 510, in which the data source 200 and data route 220 are identified.

In response to receiving the query request 310, query request proxy instructions 410 are configured to perform user verifications 420. Specifically, verifying that the user 300 has access privileges 430 to the data source 200 at which the query 320 is to be submitted and, in some embodiments of the system, verifying that the user 300 has access privileges 430 to the data route within the data source. In this regard, according to specific embodiments of the invention, access privileges may be assigned not only at the data source 200 level, but also, at the route 220 level. For example, a user 300 may have access to only designated routes 220 (i.e., designated data) at a specific data source.

In addition, user verifications 420 include verifying that the user 300 has availability from a first query quota 440 that is specific to the data source 200 at which the query 320 is to be submitted. The first query quota 440 defines the volume of queries 320 that the user 300 is permitted to submit to the data source 200 over a predetermined period of time. In specific embodiments of the invention, user verifications 420 also include verifying that the user 300 has availability from a second query quota 460 that is specific to the data route 220 at which the query 320 is to be submitted. The second query quota 460 defines the volume of queries 320 that the user 300 is permitted to submit to the data route 220 over a predetermined period of time. Thus, embodiments of the present invention not only serve to control query allotments to users on a per data source basis, but also, provides the capability to control query allotments to users on a per data route basis.

Additionally, query request proxy instructions 410 are configured to perform route verification 470, in which the identified data route 472 (i.e., the route that is to be queried) is compared to the known routes 474 (i.e., the routes stored in route manager database or the like) to verify that the identified data route 472 being queried is a real resource (i.e., a known data route 474).

In response to performing the user verifications 420 and route verification 470, query request proxy instructions 410 are configured to authorize 450 the query call for submission to the data source 200 that is responsive to the query 320. However, in specific embodiments of the invention, prior to submitting the query 320, query request proxy instructions 410 are configured to perform a cache bypass determination 480 which is configured to determine whether the query request 310 has a cache bypass indicator 312 (e.g., a specific key in a REST header or the like). In specific embodiments of the invention, the user 300 can configure their query request 310 to bypass a check for data 200 existing in cache memory 492 (i.e., the user only wants "fresh" results from the actual data source 200).

If the query request 310 is not configured for cache bypass or the system is not configured for a cache bypass functionality, query request proxy instructions 410 are configured to perform a cache determination 490 in which a determination is made as to whether the data 212 response to the query 300 is stored in cache memory 492. In this regard, data 210 from previous queries is not only returned to the user 300, but also, stored in cache memory 492 for a predetermined period of time (e.g., 24 hours or the like). Such that, if the user 300 requests the same query 300 within the predetermined time period the data 212 can retrieved from the cache memory 492, as opposed to submitting the query 320 to the data source 200. This is beneficial for two reasons, (i) retrieving the data 212 for the cache memory 492 speeds up querying times and (ii), since queries are only decremented from the query quota after results are returned from a data source, retrieving the data 212 for the cache memory 492 does not consume a user's query quota 440 or 460.

Referring to FIG. 4, a schematic/block diagram is depicted of an alternate system 104 for intelligently managing query request quotas delegated by the data sources across multiple access privileged users including determination and adjustment of data source-specific query quotas and route-specific query quotas, in accordance with embodiments of the present invention. The system 104 additionally includes second computing device 600 having a second memory 602 and one or more second processing devices 604 in communication with second memory 602. Second memory 602 stores query quota determining instructions 610 that are executable by at least one of the second processing device(s) and configured to determine first query quota 440 for specific data sources 200 and users 300 and second query quota 460 for specific data routes 220 and users 300. The determination of first and second query quotas 440, 460 is based on the overall volume of queries 320 that the enterprise or the like is authorized to perform at the data source 200 or data route 220 within the predetermined time period and the number of access privileged users 300.

Additionally, second memory 602 stores user quota adjustment identification instructions 620 that are executable by at least one of the processing devices 604 and are configured to identify users 300 that require query quota adjustment 622 (i.e., an increase or decrease in query quota based on historical use of the corresponding query quota 440, 460) and, in response to identifying the users, determine the adjustment amount 624 (i.e., the volume by which the users query quota is to be decreased or increased). In addition, second memory 602 stores quota readjustment determination instructions 630 that are executable by at least one of the processing devices 604 and are configured to determine and readjust query quotas 440 or 460 for all of the users 300 in response to identifying user(s) requiring query quota readjustment 622 and the corresponding adjustment amount 624. (e.g., increasing the query quota 440 or 460 for one user 300 decreases the query quota 440 or 460 for one or more, in some embodiments, all of the other users 300).

Moreover, in other specific embodiments of the system 104, memory 602 stores machine learning instructions 640 that are executable by at least one of the processing devices 604 and are configured to make quota adjustment predictions 642 including, but not limited to, predict which users will require quota adjustment, when the quota adjustment should occur and the amount of the quota adjustment. In response to acting on a prediction, quota readjustment determination instructions 630 are executed to determine and readjust query quotas 440 or 460 for all of the users 300.

Referring to FIG. 5, a schematic/block diagram is depicted of a system 106 for providing analytical data within a system that aggregates access privileges across various third-party data sources and intelligently manages query request quotas delegated by the data sources across multiple access privileged users, in accordance with alternate embodiments of the present invention. The system 106 additionally includes second computing device 700 having a second memory 702 and one or more second processing devices 704 in communication with second memory 702. Second memory 702 stores analytical instructions 710 that are configured to generate preconfigured analytical data/reports 710 and customized analysis configured analytical data reports 730. The data/reports 710 and 730 are generated from query request information 730 which stored within the memory 702. The query request information may include, but is not limited to, for each query request 310, the user/requester 300, the date/time 732 of the query request and any other information 734 relevant to the query request and analytical reporting.

In addition, second memory 702 stores analyst dashboard application 740 that is configured to display, on analyst workstation 800, the preconfigured analytical data/reports. In addition, analysts dashboard application 740 is configured to receive analyst inputs that define the criteria for the analyst configured analytic data/reports 730 and, in response to analytics instructions 710 generating the analyst configured analytic data/reports 730, display, on analyst workstation 800, the customized analyst configured analytical data/reports.

Referring to FIG. 6, a flow diagram is depicted of a method 900 for processing query requests across multiple data sources, in accordance with embodiments of the present invention. At Event 902, a user submits a query request that provides the details of the query without designating a third-party/vendor data source and/or data route. At Event 904 and 906, which are performed by previously discussed gateway instructions 510, the data source is identified and the data route within the data source are identified. In specific embodiments of the invention, GraphQL programming language is implemented, such that, the gateway instructions 510 can identify the data source and route based on how the query request is structured.

At Event 908, the query request is received and processed by previously discussed proxy instructions 410 and a lookup is performed to obtain query request details. Specifically, at Event 910, the access credential and query quota database(s) are accessed to render determine access credentials and query quotas for the user as they apply to the identified data source and/or data route. At Decision 912, a determination is made as to whether the user has access privileges for the data source and/or the data route. If the determination is made that user does have access privileges, at Decision 916, a determination is made as to whether the user has available query quota for the identified data source and/or the identified data route. If the determination is made that the user does have available query quota, at Decision 918, a determination is made as to whether the route is valid by comparing the identified route to known routes stored in a corresponding route database. If either (i) the determination is made that user does not have access privileges, (ii) the determination is made that the user does not have available query quota, or (iii) the route is determined to be invalid, at Event 914 an error message is generated and transmitted to the user.

In response to determining that (i) the user has access privileges, (ii) the user has available query quota, and (iii) the route is determined to be valid, at Decision 920, a determination is made as to whether the query request includes a cache bypass indicator. If the query request does not include a cache bypass indicator, at Decision 922, a determination is made as to whether the data this is responsive to the query is currently stored in cache memory. If data is currently stored in cache memory, at Event 926, the cache memory is accessed and the data therein is retrieved and returned to the used. If the determination is made that the query request includes a cache bypass indicator or the data is not currently stored in cache memory, at Event 914, a call is made to the data source and the query is made to data source using the specific data route. Once a response to the query is received from the data source, the data is communicated to the user and the user's query quota is decremented to reflect one less query outstanding.

Referring to FIG. 7, another flow diagram is depicted of a method 1000 for processing query requests, in accordance with embodiments of the present invention. At Event 1010 a query request is received from a user that includes details for a query that is to be made to a third-party/vendor data source for retrieving data from the third-party/vendor data source. As previous discussed, the query request may be configured such that the data source and data route are not explicitly defined in the query request. Thus, at optional Event 1020, one of a plurality of different data sources is identified as being configured to act on the query and provide the data, and a data route within the third-party data source is identified, which is configured to provide the data specified in the query.

At Event 1030, the user is verified as having requisite access privileges for accessing the third-party data source and, in some embodiments, the data route. In specific embodiments of the method, the verification includes accessing a database that stores the user's Active Directory® group, which catalogs the user's access privileges for the various different data sources. At Event 1040, the user is verified as having available queries from (i) a first query quota that defines a volume of queries that the user is allowed to submit to the data source over a predetermined time period and, optionally, (ii) a second query quota that defines a volume of queries that the user is allowed to submit to the data route over a predetermined time period. One of ordinary skill in the art will appreciate that the predetermined time periods for the first and second query quotas may be the same time period or different time periods (i.e., longer or shorter in duration). Moreover, if the predetermined time period for the first and second query quotas are the same, the time periods may be synchronized to start and reset in unison or the time period may be staggered such that the start and reset at different times.

At optional Event 1050, the details of the route are verified by comparing the identified route to known/stored routes to ensure that real resources are being queried. In response to successful verification of the user's access privilege, available queries in the query quotas and the details of the route, at Event 1060, the query is authorized to be submitted to the identified third-party data source and/or data route.

Thus, as described in detail above, present embodiments of the invention include systems, methods, computer program products and/or the like for aggregating the control of access privileges across various third-party data sources and intelligently managing query request quotas delegated by the data sources across multiple users having access privileges. The intelligent management of query request quota includes determining individual user quotas and identify users that require query requests beyond their allocated quotas, and, in response adjusting the identified users' quotas, as well as, adjusting the remaining users' quotas, accordingly.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for aggregating access to third-party data sources and intelligently managing access through request quotas, the system comprising:
    a plurality of third-party data sources, wherein the third-party data sources are configured to receive queries from a plurality of users and, in response to receiving a query, return data that is responsive to the query;
    a first computing platform including a first memory and one or more first processing devices in communication with the first memory, wherein the first memory stores gateway instructions, executable by the one or more first processing device and configured to:
        receive a query request from one of the plurality of users, wherein the query request requests data that is responsive to a query,
        identify the one of the plurality of third-party data sources that is configured to act on the query and provide the data, and
        identify a route within the one of the third-party data sources that is configured to act on the query and provide the data, wherein the route includes a data path that the data encounters within the one of the third-party data sources, wherein the data path includes networked-devices,
    a second computing platform including a second memory and one or more second processing devices in communication with the second memory, wherein the second memory stores query request proxy instructions, executable by the one or more second processing devices and configured to:
        receive the query request,
        determine that the user has access privileges for accessing (i) one of the plurality of third-party data sources, and (ii) the route that is configured to act on the query and provide the data,
        in response to determining that the user has access privileges for accessing (i) and (ii), determine that the user has available queries from (a) a first query quota that is specific to the user and the one of the data sources, wherein the first query quota defines a volume of queries that the user is allowed to submit to the one of the data sources over a predetermined period of time and (b) a second query quota that is specific to the user and the route within the one of the third-party data sources, wherein the second query quota defines a volume of queries that the user is allowed to submit to the route over the predetermined period of time, and
        determine whether the query request includes a cache bypass indicator that is configured to allow the query request to bypass a determination of whether the data responsive to the query is stored in a cache,
        in response to determining that the query request does not include the cache bypass indicator, determine whether the data responsive to the query is stored in cache memory,
        in response to determining that the user has available queries from the first and second query quotas and either (i) the query request includes the cache bypass indicator or (ii) the data responsive to the query is not stored in the cache memory, authorize the query for submission to the one of the plurality of third-party data sources and the route.

2. The system of claim 1, wherein the query request proxy instructions are further configured to:
    determine that the user has available queries from a second query quota that is specific to a route within the one of the third-party data sources that is configured to act on the query and provide the data, wherein the second query quota defines a volume of queries that the user is allowed to submit to the route over a predetermined period of time.

3. The system of claim 1, wherein the query request proxy instructions are further configured to:
    determine that a route to the one of the plurality of data sources is valid by comparing a route defined by the query request to known routes of the one of the plurality of data sources.

4. The system of claim 1, further comprising a third computing platform including a third memory and one or more third processing devices in communication with the third memory, wherein the third memory stores query quota determining instructions, executable by the one or more third processing devices and configured to:
    determine, for one or more of the plurality of users having access privileges to the one of the plurality of data sources, the first query quota based at least on a volume of the one or more users and a volume of queries allowed to be submitted to the one of the plurality of data sources over the predetermined period of time.

5. The system of claim 4, wherein the query quota determining instructions are further configured to:
    determine, for one or more of the plurality of users having access privileges to a route within the one of the plurality of data sources, a second query quota based at least on the volume of the one or more users and a volume of queries allowed to be submitted to the route within the one of the plurality of data sources over the predetermined period of time.

6. The system of claim 4, wherein the query quota determining instructions are further configured to:
   identify at least one of the one or more of the plurality of users that justify an increase in their respective first query quota, and
   in response to increasing the first query quota for the at least one of the one or more of the plurality of users, adjust the first query quota for other ones of the one or more of the plurality of users.

7. The system of claim 1, further comprising a third computing platform including a third memory and one or more third processing devices in communication with the third memory, wherein the third memory stores analytics instructions, executable by the one or more third processing devices and configured to:
   store information associated with each query request received by the query request proxy instructions, wherein the information includes a user submitting the query request and a date when the query request was received,
   receive a second user input that customizes metrics responsive to the stored information, and
   present a dashboard to the second user that displays the customized metrics.

8. A computer-implemented method for aggregating access to third-party data sources and intelligently managing access through request quotas, the computer-implemented method is executed by one or more processing device and comprising:
   receiving a query request from a user, wherein the query request requests data that is responsive to a query;
   identifying (i) one of a plurality of third-party data sources and (ii) a route within the one of the plurality of third-party data sources that is configured to act on the query and provide the data;
   determining that the user has access privileges for accessing (i) the one of a plurality of third-party data sources and (ii) the route within the one of the plurality of third-party data sources, wherein the route includes a data path that the data encounters within the one of the third-party data sources, wherein the data path includes networked-devices;
   in response to determining that the user has access privileges for accessing (i) and (ii), determining that the user has available queries from (a) a first query quota that is specific to the user and the one of the plurality of data sources, wherein the first query quota defines a volume of queries that the user is allowed to submit to the one of the data sources over a predetermined period of time, and (b) a second query quota that is specific to the user and the route within the one of the third-party data sources, wherein the second query quota defines a volume of queries that the user is allowed to submit to the route over the predetermined period of time;
   determining whether the query request includes a cache bypass indicator that is configured to allow the query request to bypass a determination of whether the data responsive to the query is stored in a cache;
   in response to determining that the query request does not include the cache bypass indicator, determining whether the data responsive to the query is stored in cache memory; and
   in response to determining that the user has available queries from the first and second query quotas and either (i) the query request includes the cache bypass indicator or (ii) the data responsive to the query is not stored in the cache memory, authorizing the query for submission to the one of the third-party data sources and the route.

9. The computer-implemented method of claim 8, further comprising:
   determining that a route to the one of the plurality of data sources is valid by comparing a route defined by the query request to known routes of the one of the plurality of data sources.

10. A computer program product including a non-transitory computer-readable medium, the non-transitory computer-readable medium comprising:
    a first set of codes for causing a computer to receive a query request from a user, wherein the query request requests data that is responsive to a query;
    a second set of codes for causing a computer to identify (i) one of a plurality of third-party data sources and (ii) a route within the one of the plurality of third-party data sources that is configured to act on the query and provide the data, wherein the route includes a data path that the data encounters within the one of the third-party data sources, wherein the data path includes networked-devices;
    a third set of codes for causing a computer to determine that the user has access privileges for accessing (i) the one of a plurality of third-party data sources that is configured to act on the query and provide the data, and (ii) the route within the one of the plurality of third-party data sources;
    a fourth set of codes for causing a computer to, in response to determining that the user has access privileges for accessing (i) and (ii), determine that the user has available queries from (a) a first query quota that is specific to the user and the one of the plurality of data sources, wherein the first query quota defines a volume of queries that the user is allowed to submit to the one of the data sources over a predetermined period of time, and (b) a second query quota that is specific to the user and the route within the one of the third-party data sources, wherein the second query quota defines a volume of queries that the user is allowed to submit to the route over the predetermined period of time;
    a fifth set of codes for causing a computer to a second set of codes for causing a computer to determine whether the query request includes a cache bypass indicator that is configured to allow the query request to bypass a determination of whether the data responsive to the query is stored in a cache and, in response to determining that the query request does not include the cache bypass indicator, determine whether the data responsive to the query is stored in cache memory; and
    a sixth set of codes for causing a computer to, in response to determining that the user has available queries from the first and second query quotas and either (i) the query request includes the cache bypass indicator or (ii) the data responsive to the query is not stored in the cache memory, authorize the query for submission to the one of the third-party data sources and the route.

* * * * *